United States Patent
Kalkunte et al.

(10) Patent No.: US 6,891,835 B2
(45) Date of Patent: May 10, 2005

(54) SERVICING OUTPUT QUEUES DYNAMICALLY ACCORDING TO BANDWIDTH ALLOCATION IN A FRAME ENVIRONMENT

(75) Inventors: Mohan Kalkunte, Sunnyvale, CA (US); Jim Mangin, San Ramon, CA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 10/278,034

(22) Filed: Oct. 22, 2002

(65) Prior Publication Data

US 2003/0128707 A1 Jul. 10, 2003

Related U.S. Application Data

(63) Continuation of application No. 09/248,155, filed on Feb. 9, 1999, now Pat. No. 6,470,016.

(51) Int. Cl.[7] .............................................. H04L 12/28
(52) U.S. Cl. ............................ 370/395.41; 370/395.42; 370/412
(58) Field of Search ......................... 370/395.41, 395.4, 370/395.43, 395.71, 395.72, 412, 413, 415, 417, 395.42, 230.1, 232

(56) References Cited

U.S. PATENT DOCUMENTS

| | | | | |
|---|---|---|---|---|
| 5,793,747 A | * | 8/1998 | Kline | .......................... 370/230 |
| 5,956,341 A | * | 9/1999 | Galand et al. | .............. 370/412 |
| 5,999,534 A | * | 12/1999 | Kim | ...................... 370/395.42 |
| 6,018,527 A | | 1/2000 | Yin et al. | |
| 6,061,330 A | | 5/2000 | Johansson | |
| 6,134,217 A | | 10/2000 | Stiliadis et al. | |
| 6,188,698 B1 | | 2/2001 | Galand et al. | |
| 6,201,793 B1 | * | 3/2001 | Chen et al. | ................. 370/238 |
| 6,246,687 B1 | | 6/2001 | Siu | |
| 6,304,552 B1 | | 10/2001 | Chapman et al. | |
| 6,438,106 B1 | * | 8/2002 | Pillar et al. | ................. 370/232 |
| 6,470,016 B1 | | 10/2002 | Kalkunte et al. | |
| 6,477,144 B1 | * | 11/2002 | Morris et al. | ............. 370/230.1 |
| 6,526,061 B1 | * | 2/2003 | Briem | .................... 370/395.42 |

OTHER PUBLICATIONS

Shreedhar, et al; "Efficient Fair Queuing Using Deficit Round Robin"; pp. 1–22, Oct. 16, 1995.

* cited by examiner

Primary Examiner—Phirin Sam
(74) Attorney, Agent, or Firm—Neil G.J. Mothew

(57) ABSTRACT

An adaptive weighted round robin scheduling apparatus and method schedules variable-length frame transmissions from a plurality of output queues having different transmission priorities by first allocating, for each queue, a number of bandwidth segments for a bandwidth cycle and a number of transmission opportunities for a round robin cycle, and then processing the queues consecutively in a round-robin fashion, beginning with a highest priority queue, until none of the queues has any bandwidth remaining. More specifically, during each iteration of a round robin cycle, a queue is permitted to transmit a frame if the queue has at least one remaining transmission opportunity, the queue has a frame ready for transmission, and the queue has at least one remaining bandwidth segment, and furthermore the number of transmission opportunities for the queue is decremented by at least one. Upon transmitting a frame, the number of bandwidth segments for the queue is decreased by the number of bandwidth segments in the frame. If a queue has no frame ready for transmission, then the queue may be either penalized, in which case the number of bandwidth segments for the queue is reduced, or forced to forfeit its bandwidth segments, in which case any remaining bandwidth segments are reallocated to other queues and the number of bandwidth segments and the number of transmission opportunities for the queue are set to zero.

34 Claims, 14 Drawing Sheets

SERVICING OUTPUT QUEUES DYNAMICALLY ACCORDING TO BANDWIDTH ALLOCATION IN A FRAME ENVIRONMENT

CROSS-REFERENCE TO RELATED APPLICATIONS

This application is a continuation of prior application U.S. Ser. No. 09/248,155 filed on Feb. 9, 1999, now U.S. Pat. No. 6,470,016.

FIELD OF THE INVENTION

The present invention relates generally to communication networks, and, more particularly, to servicing output queues dynamically according to bandwidth allocation in a frame environment.

BACKGROUND OF THE INVENTION

In today's information age, communication networks are used to transport vast amounts of information. As more and more information is carried over these communication networks, the various communication devices within the communication network, such as routers and switches, are called upon to process increasing amounts of data traffic. Often times, this data traffic includes data having different priority levels, and specifically different bandwidth requirements. Therefore, the various communication devices within the communication network must schedule data transmission opportunities for the data based upon, among other things, the relative bandwidth requirements of the data.

One well-known scheduling discipline is commonly referred to as Weighted Round Robin (WRR) scheduling. In WRR scheduling, each priority level is assigned a relative weight, and transmission opportunities are allocated for each priority level based upon the relative weights of the priority levels, using a round-robin technique to cycle between the priority levels.

Another well-known scheduling discipline is commonly referred to as Weighted Fair Queuing (WFQ) scheduling. In WFQ scheduling, transmission opportunities are allocated to the priority levels by computing a finishing time for each data transmission and scheduling data transmissions based on the computed finishing times. In WFQ scheduling, any unused bandwidth from one priority level is automatically reallocated to the other priority levels.

WRR scheduling and WFQ scheduling work well, and are relatively easy to implement, when the communication network uses fixed-length data transmissions (for example, in a cell-based communication network). However, scheduling data transmission opportunities in a frame-based communication network is more complex due to the variability of frame sizes. This variability of frame sizes can result in incorrect bandwidth allocation when WRR scheduling is used, and makes it difficult to compute finishing times when WFQ scheduling is used.

Thus, a need has remained for a scheduling discipline that is easy to implement in a frame-based communication network and is capable of dynamically reallocating any unused bandwidth from one logical communication channel to the other logical communication channels.

SUMMARY OF THE INVENTION

In accordance with one aspect of the invention, an adaptive weighted round robin scheduling technique schedules variable-length frame transmissions from a plurality of output queues having different transmission priorities by first allocating, for each queue, a number of bandwidth segments for a bandwidth cycle and a number of transmission opportunities for a round robin cycle, and then processing the queues consecutively in a round-robin fashion, beginning with a highest priority queue, until none of the queues has any bandwidth remaining. More specifically, during each iteration of a round robin cycle, a queue is permitted to transmit a frame if the queue has at least one remaining transmission opportunity, the queue has a frame ready for transmission, and the queue has at least one remaining bandwidth segment, and furthermore the number of transmission opportunities for the queue is decremented by at least one. Upon transmitting a frame, the number of bandwidth segments for the queue is decreased by the number of bandwidth segments in the frame. If a queue has no frame ready for transmission, then the queue may be either penalized, in which case the number of bandwidth segments for the queue is reduced, or forced to forfeit its bandwidth segments, in which case any remaining bandwidth segments are reallocated to other queues and the number of bandwidth segments and the number of transmission opportunities for the queue are set to zero.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

As discussed above, a need has remained for a scheduling discipline that is easy to implement in a frame-based communication network and is capable of dynamically reallocating any unused bandwidth from one logical communication channel to the other logical communication channels. The present invention utilizes a novel adaptive WRR scheduling discipline that schedules variable-length frame transmissions from a plurality of output queues having different transmission priorities by first allocating, for each queue, a number of bandwidth segments for a bandwidth cycle and a number of transmission opportunities for a round robin cycle, and then processing the queues consecutively in a round-robin fashion, beginning with a highest priority queue, until none of the queues has any bandwidth remaining. More specifically, during each iteration of a round robin cycle, a queue is permitted to transmit a frame if the queue has at least one remaining transmission opportunity, the queue has a frame ready for transmission, and the queue has at least one remaining bandwidth segment, and furthermore the number of transmission opportunities for the queue is decremented by at least one. Upon transmitting a frame, the number of bandwidth segments for the queue is decreased by the number of bandwidth segments in the frame. If a queue has no frame ready for transmission, then the queue may be either penalized, in which case the number of bandwidth segments for the queue is reduced, or forced to forfeit its bandwidth segments, in which case any remaining bandwidth segments are reallocated to other queues and the number of bandwidth segments and the number of transmission opportunities for the queue are set to zero.

Figure 1:
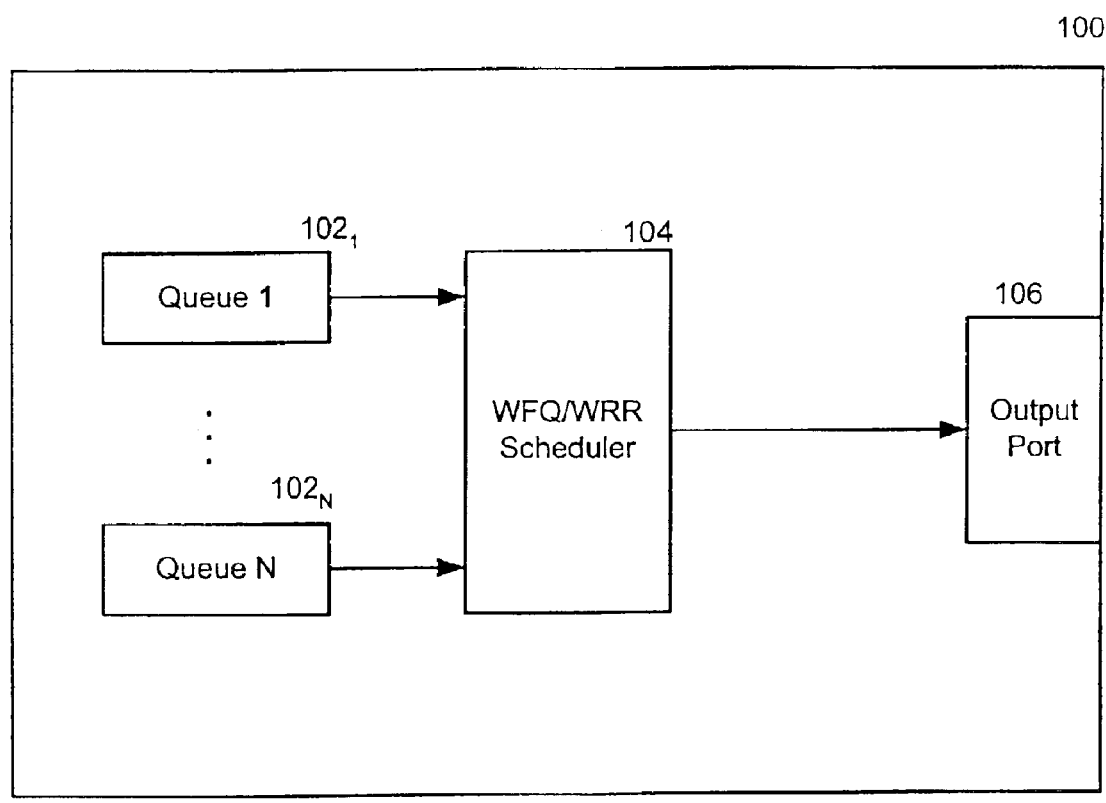
FIG. 1 is a block diagram showing an exemplary scheduling device as is known in the art.

FIG. 1 is a block diagram showing an exemplary scheduling device 100 as known in the prior art. The scheduling device 100 includes a number of queues $102_1$ through $102_N$ (referred to hereinafter collectively as "queues 102" and individually as a "queue 102"). Each queue is associated with a particular priority level, and is used for queuing data having the particular priority. A scheduler 104, employing either a WFQ scheduling discipline or a WRR scheduling discipline, is used to schedule data transmissions for data queued in the queues 102. The scheduler 104 forwards data from the queues 102 to an output port 106.

Figure 2:
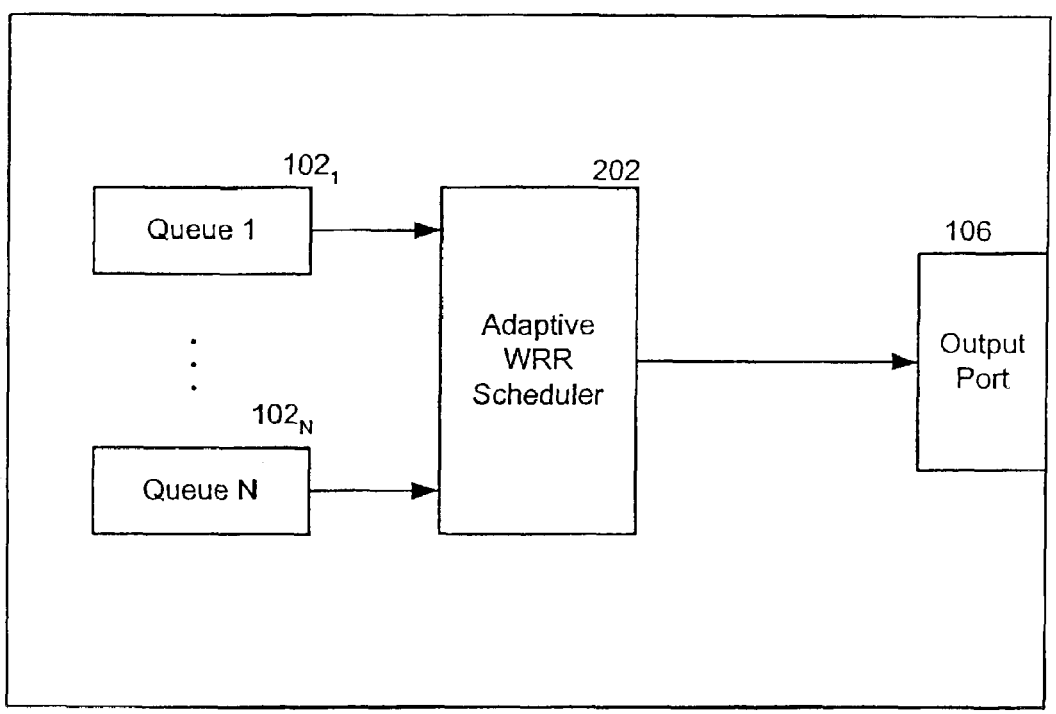
FIG. 2 is a block diagram showing an exemplary scheduling device in accordance with a preferred embodiment of the present invention.

FIG. 2 is a block diagram showing an exemplary scheduling device 200 in accordance with a preferred embodiment of the present invention. The scheduling device 200 utilizes a novel Adaptive WRR Scheduler 202 to schedule transmission opportunities for data queued in the queues 102. Again, each queue is associated with a particular priority level, and is used for queuing data having the particular priority. More specifically, in a preferred embodiment of the present invention, each queue is associated with data having particular bandwidth requirements. The Adaptive WRR Scheduler 202 assigns a relative weight to each queue 102 based upon the bandwidth requirements for the queue 102. The Adaptive WRR Scheduler 202 uses a modified round-robin technique (described in detail below) to schedule transmission opportunities for the queues 102 according to the relative weights of the queues 102 and dynamically reallocate unused bandwidth from one queue to the other queues.

In order to understand the workings of the Adaptive WRR Scheduler 202, and particularly the modified round-robin technique employed thereby, it is convenient to model the system. Therefore, certain conventions and terms are used when describing various embodiments of the present invention below.

One convention used when describing the various embodiments of the present invention is that the queues 102 are presumed to be in decreasing order of priority, with queue 1 as the highest priority queue, and queue N as the lowest priority queue. Of course, this convention is for convenience and simplicity only, and there is no requirement that the queues 102 be in such a decreasing order of priority. In fact, the order of the queues has no particular effect upon the present invention, and the skilled artisan will understand how the various embodiments of the present invention described below can be modified to handle various queue priority orders.

N represents the number of queues. The value N is determined prior to scheduling data transmissions, and is not changed dynamically.

L represents the maximum frame length. In preferred embodiments of the present invention, the maximum frame length L is equal to 1518 bytes. The value L is determined prior to scheduling data transmissions, and is not changed dynamically.

S represents the size of one bandwidth segment. In accordance with the present invention, the amount of bandwidth scheduled for each data transmission is an integral number of bandwidth segments. In preferred embodiments of the present invention, the bandwidth segment size S is preferably a fixed value equal to 64 bytes, although the invention can be practiced with any bandwidth segment size, and the bandwidth segment size may be changed dynamically based upon a user input, a management entity, or changing traffic patterns.

The term "round robin cycle" refers to a single scheduling interval of a fixed number of transmission opportunities.

X[n] represents the number of transmission opportunities allocated for the queue n in a round robin cycle. The number of transmission opportunities allocated for the queue n in a round robin cycle is proportional to the relative weight of the queue n. The values X[n] are determined prior to scheduling data transmissions, and are not changed dynamically.

The term "bandwidth cycle" refers to a single scheduling interval of a fixed amount of bandwidth (i.e., a fixed number of bandwidth segments). A bandwidth cycle initially consists of a fixed number of bandwidth segments sufficient to transmit a predetermined number of maximum size frames, preferably equal to the number of bandwidth segments required to transmit the number of frames in a single round robin cycle if each frame is a maximum size frame. For each bandwidth cycle, the fixed number of bandwidth segments are divided among the queues in proportion to the bandwidth requirements (i.e., weight) of the queues.

Y[n] represents the number of bandwidth segments initially allocated to the queue n during each bandwidth cycle. The number of segments initially allocated to the queue n during each bandwidth cycle must be greater than or equal to the number of segments need to transmit X[n] maximum length frames. Therefore, in preferred embodiments of the present invention, the value Y[n] is equal to the number of segments in a maximum length frame (i.e., L/S) times the value X[n], rounded to the next higher integer if necessary (i.e., Y[n]=round(X[n]*L/S). The values Y[n] are determined prior to scheduling data transmissions, and are not changed dynamically.

Qcounter[n] represents the number of transmission opportunities remaining for the queue n during a given round robin cycle.

BW[n] represents the number of bandwidth segments remaining for the queue n during a give bandwidth cycle.

Figure 3:
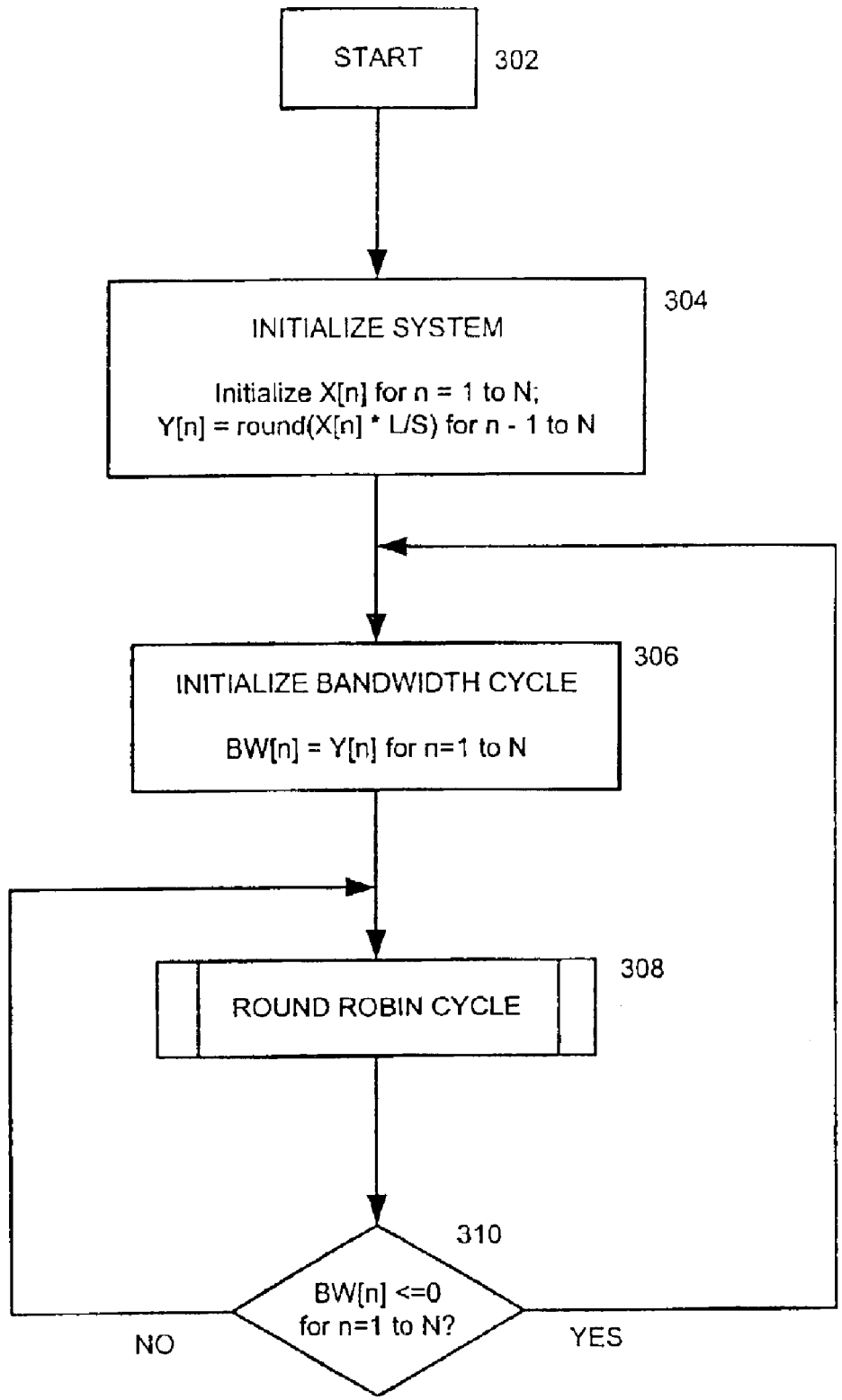
FIG. 3 is a logic flow diagram showing the relationship between bandwidth cycles and round robin cycles in accordance with the present invention.

FIG. 3 is a logic flow diagram showing the relationship between the bandwidth cycles and the round robin cycles in accordance with the present invention. The logic begins in step 302, and proceeds to initialize the system, in step 304. Specifically, the logic initializes the values X[n] and Y[n] for all queues n as described above. The logic then performs a bandwidth cycle. The logic initializes the bandwidth cycle, in step 306, by setting BW[n] equal to Y[n] for all queues n. The logic then performs a round robin cycle (described in more detail with reference to FIG. 4 below), in step 308. After performing the round robin cycle, in step 308, the logic determines whether the bandwidth cycle is complete, in step 310, specifically by determining whether none of the queues n has any bandwidth segments remaining (i.e., whether BW[n]<=0 for n=1 to N). If at least one of the queues n has any bandwidth segments remaining (NO in step 310), then the logic recycles to step 308 to perform another round robin cycle. If none of the queues n has any bandwidth segments remaining (YES in step 310), then the logic recycles to step 306 to perform another bandwidth cycle.

Figure 4:
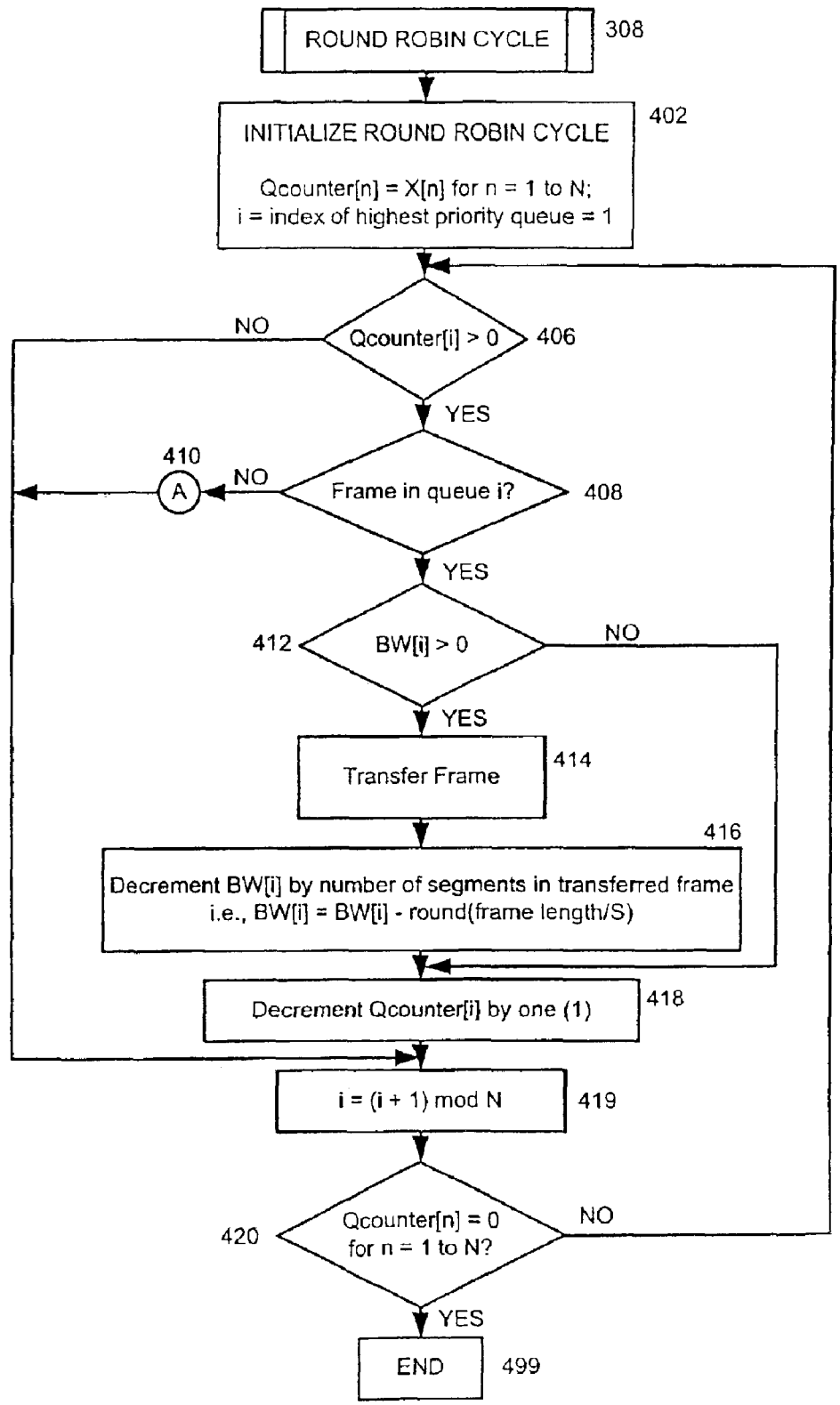
FIG. 4 is a logic flow diagram showing exemplary round robin cycle logic in accordance with the present invention.

FIG. 4 is a logic flow diagram showing exemplary round robin cycle logic 308. The logic first initializes the round robin cycle, in step 402, by setting Qcounter[n] equal to X[n] for all queues n and by setting a queue index i equal to the index of the highest priority queue (i.e., queue 1 by convention). The logic then performs a logic loop in which transmission opportunities are provided for each queue i based upon, among other things, the number of transmission opportunities remaining for the queue i (i.e., Qcounter[i]) and the number of bandwidth segments remaining for the queue i (i.e., BW[i]). Specifically, the queue i is permitted to transfer a frame if at least one transmission opportunity remains (i.e., if Qcounter[i]>0), there is a frame in the queue i ready to be transferred, and at least one bandwidth segment remains (i.e., if BW[i]>0).

More specifically, the logic determines whether the queue i has at least one transmission opportunity remaining, in step 406. If the queue i has no transmission opportunities remaining (NO in step 406), then the logic proceeds to step 419. However, assuming the queue i has at least one transmission opportunity remaining (YES in step 406), then the logic determines whether there is a frame in the queue i ready to be transferred, in step 408. If there is no frame in the queue i ready to be transferred (NO in step 408), then the logic performs an empty queue procedure (described in detail below), in step 410, and proceeds to step 419. However, assuming there is a frame in the queue i ready to be transferred (YES in step 408), then the logic determines whether the queue i has at least one bandwidth segment remaining, in step 412. If the queue i has no bandwidth segments remaining (NO in step 412), then the logic proceeds to step 418. However, assuming the queue i has at least one bandwidth segment remaining (YES in step 412), then the logic transfers the frame from the queue i, in step 414, decrements BW[i] by the number of segments in the transferred frame, in step 416, and proceeds to step 418.

In step 418, the logic decrements Qcounter[i] by one (1). The logic then proceeds to step 419.

In step 419, the logic increments the queue index i to index the next queue. The logic then determines whether the round robin cycle is complete, in step 420, specifically by determining whether there are no transmission opportunities remaining for any of the queues (i.e., whether Qcounter[n]=0 for n=1 to N). If at least one of the queues has a transmission opportunity remaining (NO in step 420), then the logic recycles to step 406. If there are no transmission opportunities remaining for any of the queues (YES in step 420), then the logic terminates the round robin cycle in step 499.

The empty queue procedure performed in step 410 allows the logic to adapt when the queue i has no frames ready to be transferred. In general, it is desirable for the queue i to forfeit any remaining bandwidth segments for the remainder of the bandwidth cycle so that the forfeited bandwidth segments can be reallocated to one or more other queues that have frames ready to be transferred, as shown and described with reference to FIG. 7 below. However, in certain situations, it may be desirable for the queue i to keep any remaining bandwidth segments, as shown and described with reference to FIG. 5 below, in case the queue i receives any frames during the remainder of the bandwidth cycle. Therefore, the logic may selectively reallocate the remaining bandwidth segments or permit the queue i to keep the remaining bandwidth segments, as shown and described with reference to FIG. 13 below.

Figure 5:
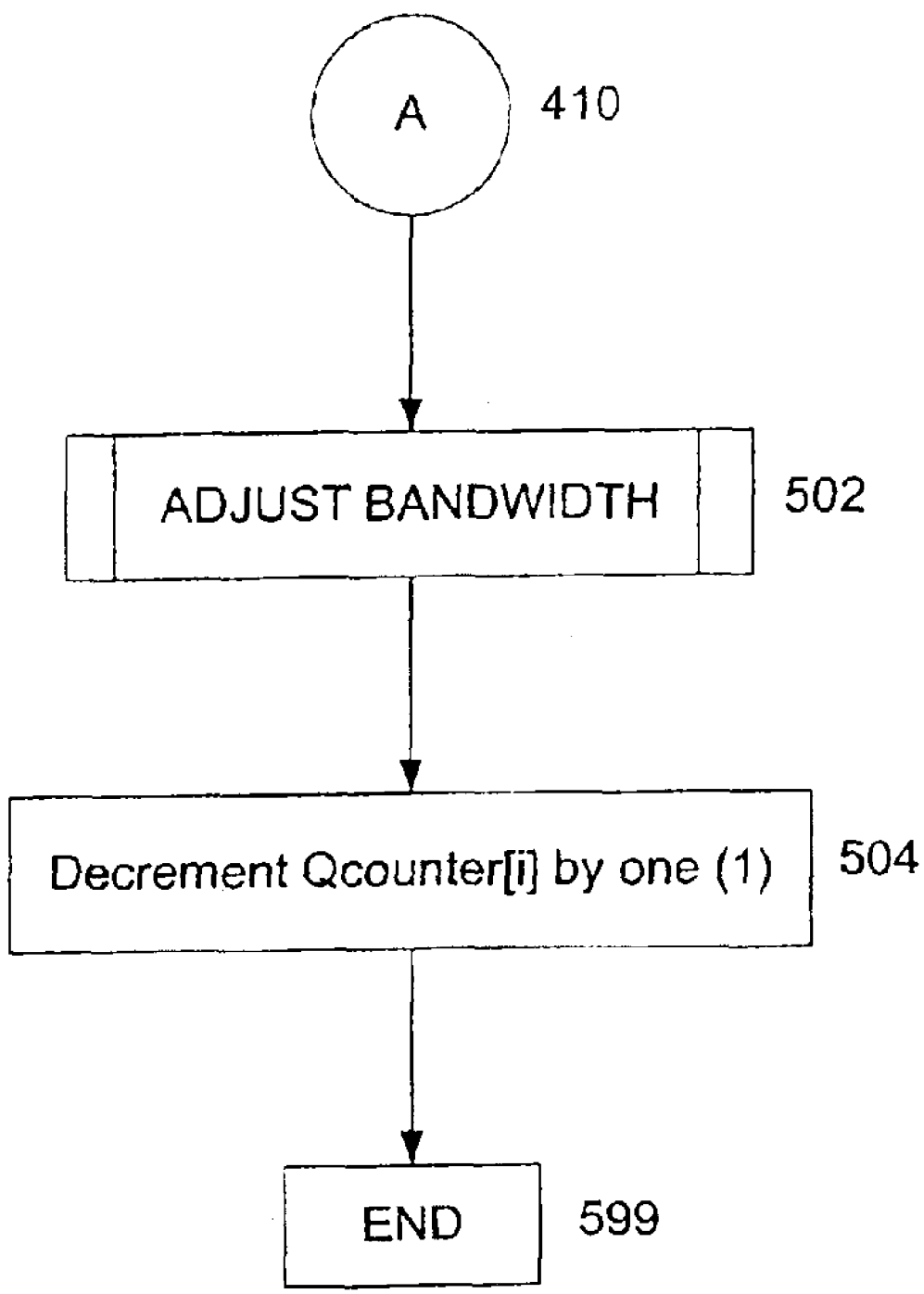
FIG. 5 is a logic flow diagram showing a first exemplary empty queue procedure in accordance with the present invention in which an empty queue keeps its remaining bandwidth segments.

FIG. 5 is a logic flow diagram showing an exemplary empty queue procedure 410 in which the queue i keeps any remaining bandwidth segments. Specifically, the logic performs a bandwidth adjustment procedure (described in detail below) to adjust the number of remaining bandwidth segments for queue i, in step 502, and decrements the number of remaining transmission opportunities for the queue i by decrementing Qcounter[i] by one (1), in step 504. The empty queue procedure 410 terminates in step 599.

The bandwidth adjustment procedure 502 is used to decrease the number of remaining bandwidth segments for the queue i by some predetermined amount, particularly as a penalty for not transferring a frame when given the opportunity to do so, but also to prevent the empty queue from creating an endless bandwidth cycle loop that prevents any other queue from obtaining transmission opportunities. The number of bandwidth segments removed from the queue i is effectively a policy decision reflecting a trade-off between the bandwidth requirements of the queue i compared to the bandwidth requirements of the other queues.

Figure 6A:
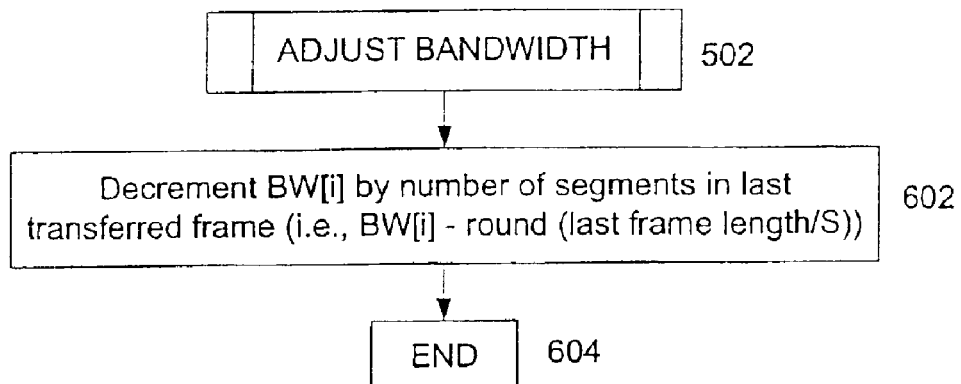
FIG. 6A is a logic flow diagram showing a first exemplary embodiment of a bandwidth adjustment procedure in accordance with the present invention in which bandwidth is adjusted by the number of bandwidth segments in a previously transmitted frame.

One exemplary embodiment of the bandwidth adjustment procedure 502 decreases the number of remaining bandwidth segments for the queue i by the number of segments in a last transferred frame, as shown in FIG. 6A. Such an embodiment imposes a reasonable penalty on the queue i for failing to transfer a frame when given the opportunity to do so, since the penalty is equivalent to retransmitting the previous frame.

Figure 6B:
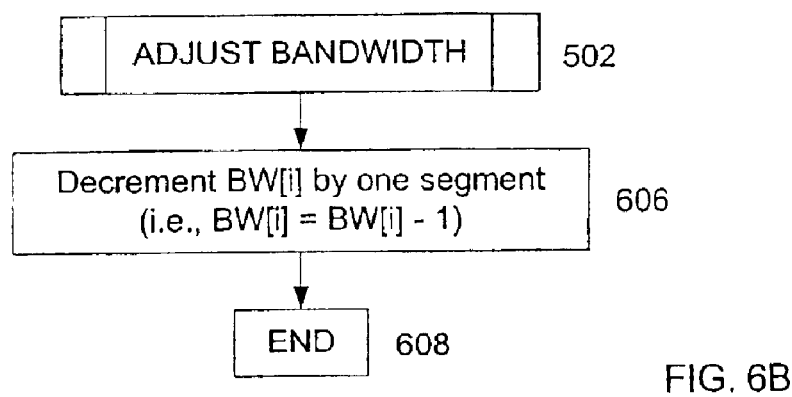
FIG. 6B is a logic flow diagram showing a second exemplary embodiment of a bandwidth adjustment procedure in accordance with the present invention in which bandwidth is adjusted by one bandwidth segment.

Another exemplary embodiment of the bandwidth adjustment procedure 502 decreases the number of remaining bandwidth segments for the queue i by one segment, as shown in FIG. 6B. Such an embodiment imposes a very small penalty on the queue i for failing to transfer a frame when given the opportunity to do so, since the penalty is equivalent to transferring the smallest unit of data possible (i.e., one bandwidth segment).

Figure 6C:
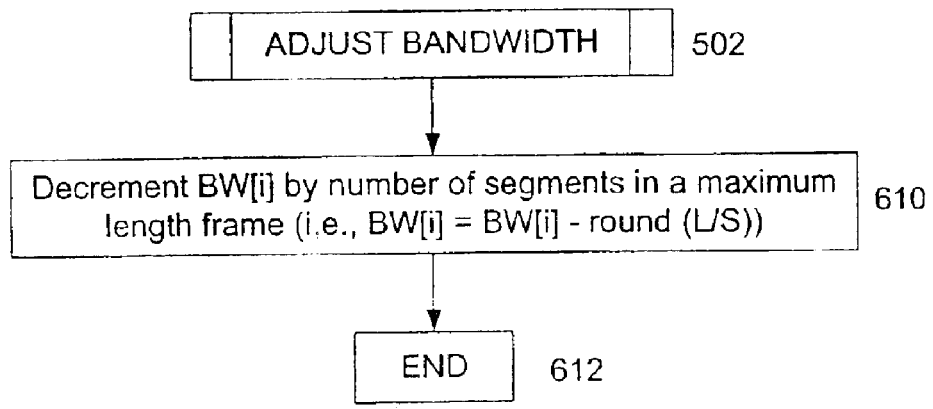
FIG. 6C is a logic flow diagram showing a third exemplary embodiment of a bandwidth adjustment procedure in accordance with the present invention in which bandwidth is adjusted by the number of bandwidth segments in a maximum length frame.

Yet another exemplary embodiment of the bandwidth adjustment procedure 502 decreases the number of remaining bandwidth segments for the queue i by the number of segments in a maximum length frame, as shown in FIG. 6C. Such an embodiment imposes a very large penalty on the queue i for failing to transfer a frame when given the opportunity to do so, since the penalty is equivalent to transferring the largest unit of data possible (i.e., a maximum length frame).

Of course, many other embodiments of the bandwidth adjustment procedure 502 are possible to reflect different policy decisions. For example, one policy decision may be to penalize each queue by its average frame size (as opposed to the last frame size as shown in FIG. 6A), in which case the Adaptive WRR Scheduler 202 may calculate and maintain an average frame size for each queue and decrease the number of remaining bandwidth segments for queue n by the average frame size of queue n. Another policy decision may be to penalize each queue by the overall average frame size, in which case the Adaptive WRR Scheduler 202 may calculate and maintain an overall average frame size and decrease the number of remaining bandwidth segments for queue n by the overall average frame size. Yet another policy decision may be to penalize each queue in relation to the priority of the queue, in which case the Adaptive WRR Scheduler 202 may penalize each queue in inverse proportion to its priority, or else penalize certain high priority queues (i.e., queues above a predetermined priority) by a small amount (for example, by decreasing the number of remaining bandwidth segments by one segment, as shown in FIG. 6B) and penalize lower priority queues by a large amount (for example, by decreasing the number of remaining bandwidth segments by the number of segments in a maximum length frame, as shown in FIG. 6C). These and other alternative embodiments will be apparent to the skilled artisan.

Figure 7:
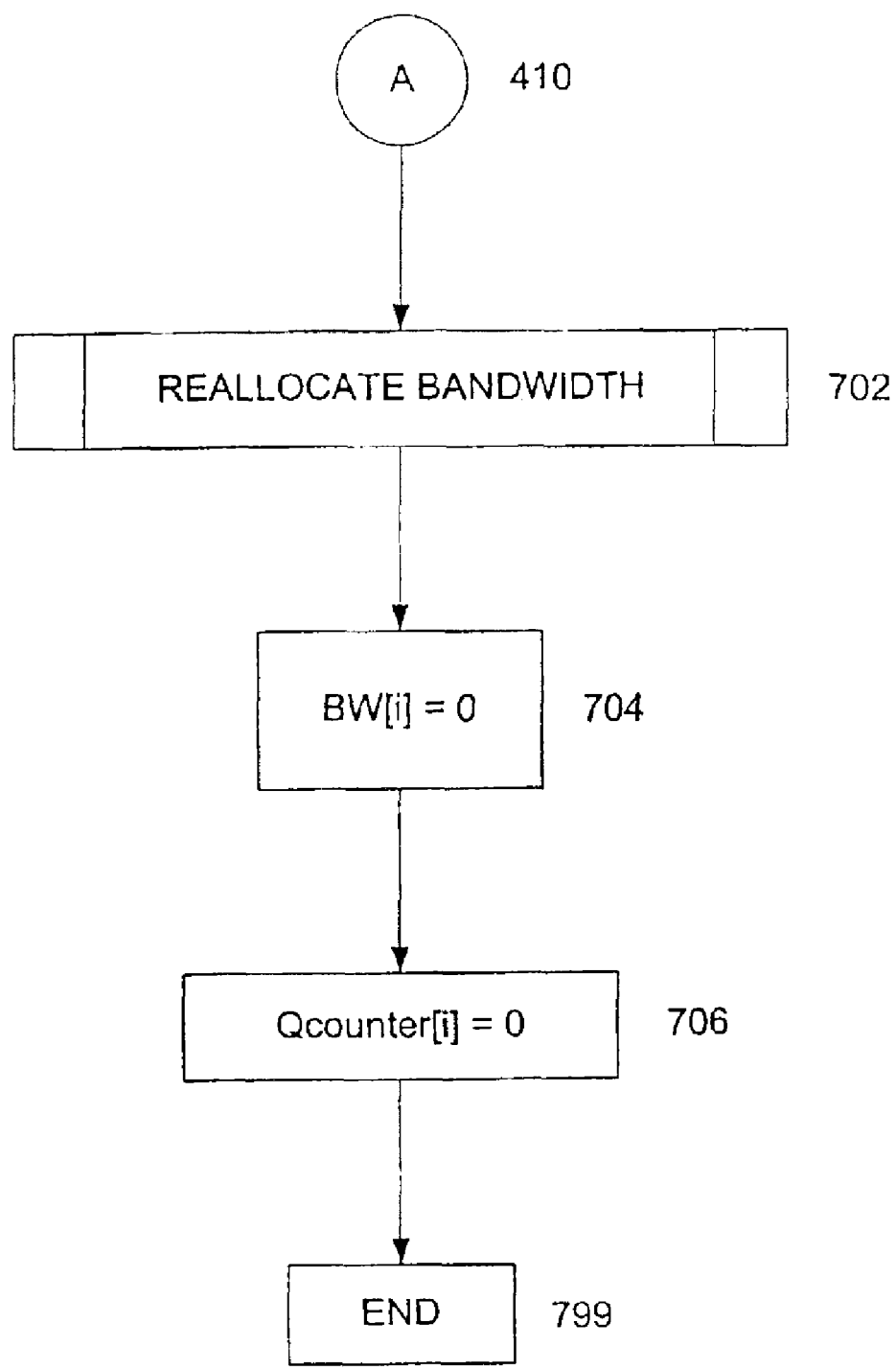
FIG. 7 is a logic flow diagram showing a second exemplary empty queue procedure in accordance with the present invention in which an empty queue forfeits its remaining bandwidth segments.

FIG. 7 is a logic flow diagram showing an exemplary empty queue procedure 410 in which the queue i forfeits any remaining bandwidth segments, which are then reallocated to one or more other queues that have frames ready to be transferred. Specifically, the logic performs a bandwidth reallocation procedure (described in detail below) to reallocate the bandwidth from the queue i to one or more other queues, in step 702, forces the queue i to forfeit any remaining bandwidth segments by setting BW[i] equal to zero (0), in step 704, and forces the queue i to forfeit any remaining transmission opportunities by setting Qcounter[i] equal to zero (0), in step 706. The empty queue procedure 410 terminates in step 799.

The bandwidth reallocation procedure 702 is used to distribute any remaining bandwidth segments from the queue i to the other queues. The distribution of the remaining bandwidth segments from the queue i to the other queues is effectively a policy decision reflecting a trade-off between the bandwidth requirements of the other queues and other policy considerations.

Figure 8:
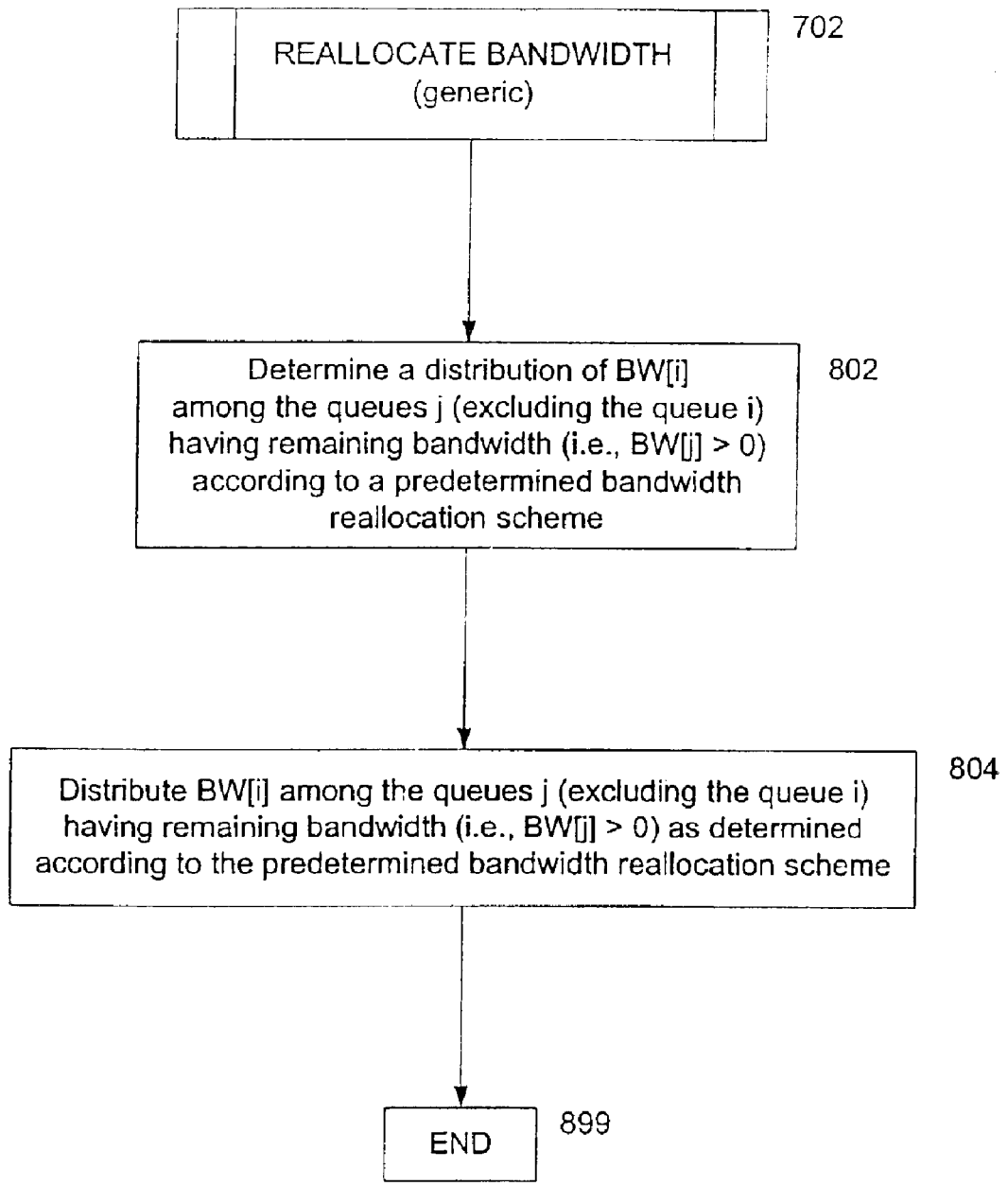
FIG. 8 is a logic flow diagram showing a first exemplary bandwidth reallocation procedure in accordance with the present invention.

FIG. 8 is a logic flow diagram describing a generic bandwidth reallocation procedure 702. In particular, the logic determines a distribution of the remaining bandwidth segments from the queue i among the other queues having remaining bandwidth segments according a predetermined bandwidth reallocation scheme, in step 802, and distributes the remaining bandwidth segments from the queue i among the other queues having remaining bandwidth segments according the predetermined bandwidth reallocation scheme, in step 804. Specific embodiments of the bandwidth reallocation procedure 702 are described in detail below. The logic terminates in step 899.

One embodiment of the bandwidth reallocation procedure 702, shown and described with reference to FIG. 9, distributes the remaining bandwidth segments from the queue i among all other queues having remaining bandwidth segments in proportion to the relative weights of those other queues. Specifically, the logic first determines a total weight M of all queues j (excluding the queue i) having remaining bandwidth, in step 902. One embodiment of the present invention computes the total weight M by computing the sum of X[j] for all queues j. Another embodiment of the present invention computes the total weight M by computing the sum of Y[j] for all queues j. The logic then allocates a portion of the remaining bandwidth segments from the queue i to each queue j (excluding the queue i) having remaining bandwidth based upon the relative weight of the queue j, in step 904. In an embodiment of the present invention in which the total weight M is equal to the sum of X[j] for all queues j, the BW[j] is increased by BW[i] times X[j]/M (i.e., the relative weight of queue j). In an embodiment of the present invention in which the total weight M is equal to the sum of Y[j] for all queues j, the BW[j] is increased by BW[i] times Y[j]/M (i.e., the relative weight of queue j). The logic terminates in step 999.

Figure 9:
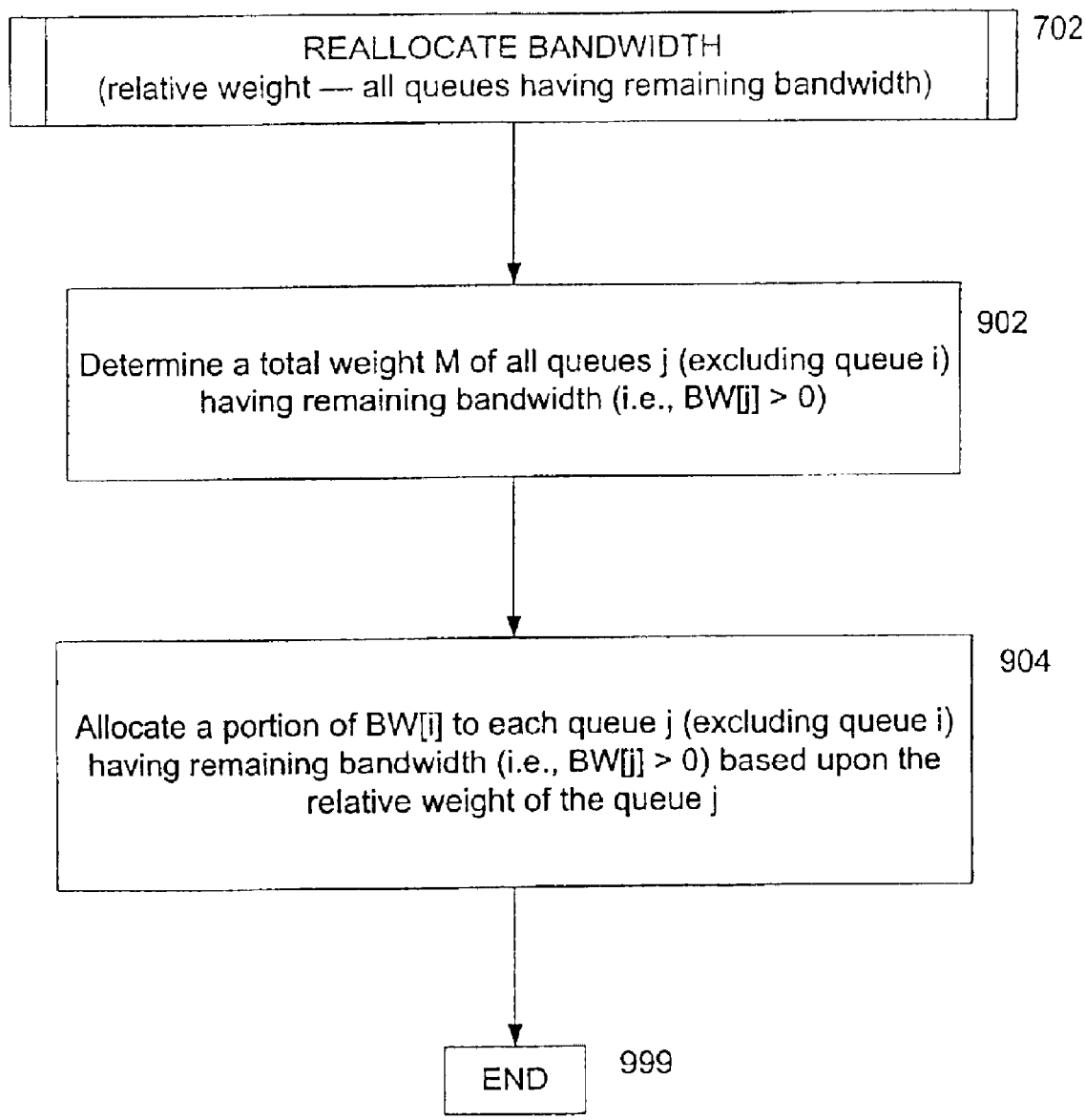
FIG. 9 is a logic flow diagram showing a second exemplary bandwidth reallocation procedure in accordance with the present invention in which the remaining bandwidth segments from the empty queue are distributed among all other queues having remaining bandwidth in proportion to the relative weights of those queues.
Figure 10:
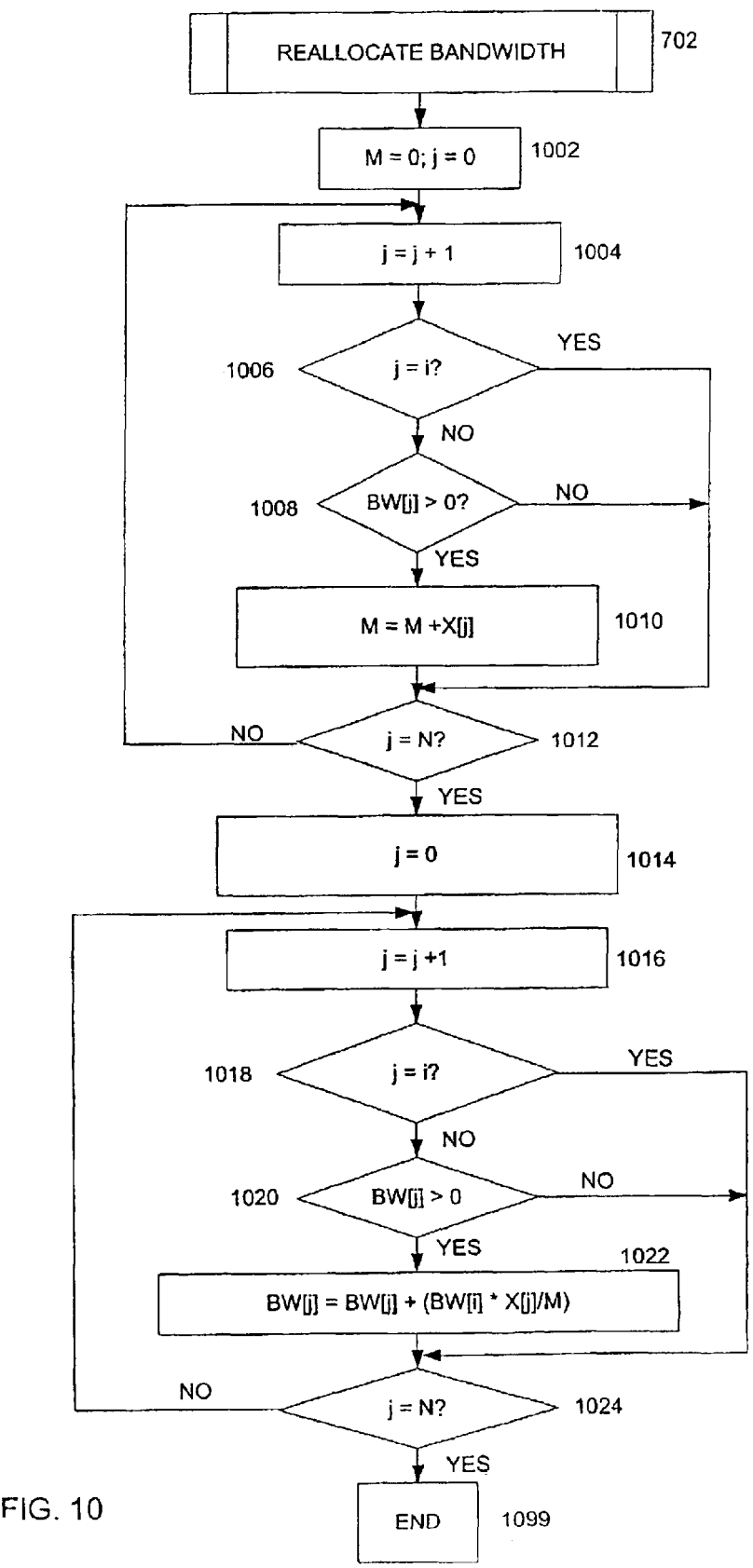
FIG. 10 is a logic flow diagram showing specific details of the second exemplary bandwidth reallocation procedure in accordance with the present invention in which the remaining bandwidth segments from the empty queue are distributed among all other queues having remaining bandwidth in proportion to the relative weights of those queues.

Thus, with reference to FIG. 10, the logic first initializes the total weight M to zero (0), and also initializes a queue index j to zero (0), in step 1002. The logic then proceeds to determine the total weight M of all queues j (excluding the queue i) having remaining bandwidth (step 902 from FIG. 9). Specifically, the logic increments the queue index j, in step 1004, and determines whether the queue index j is equal to the queue index i, in step 1006. If the queue index j is equal to the queue index i (YES in step 1006), then the logic proceeds to step 1012. However, assuming the queue index j is not equal to the queue index i (NO in step 1006), then the logic determines whether the queue j has any remaining bandwidth, in step 1008. If the queue j has no remaining bandwidth (NO in step 1008), then the logic proceeds to step 1012. However, assuming the queue j has remaining bandwidth (YES in step 1008), then the logic increments the total weight M by the weight assigned to the queue j (for example, X[j] or Y[j]), in step 1010, and proceeds to step 1012.

In step 1012, the logic determines whether all queues have been processed, specifically by determining whether the queue index j is equal to the number of queues N. If the queue index j is not equal to the number of queues N (NO in step 1012), then the logic recycles to step 1004 to process the next queue. If the queue index j is equal to the number of queues N (YES in step 1012), then the logic proceeds to step 1014.

Beginning in step 1014, the logic allocates a portion of the remaining bandwidth segments from the queue i to each queue j (excluding the queue i) having remaining bandwidth based upon the relative weight of the queue j (step 904 from FIG. 9). Specifically, the logic resets the queue index j to zero (0), in step 1014. The logic then increments the queue index j, in step 1016, and determines whether the queue index j is equal to the queue index i, in step 1018. If the queue index j is equal to the queue index i (YES in step 1018), then the logic proceeds to step 1024. However, assuming the queue index j is not equal to the queue index i (NO in step 1018), then the logic determines whether the queue j has any remaining bandwidth, in step 1020. If the queue j has no remaining bandwidth (NO in step 1020), then the logic proceeds to step 1024. However, assuming the queue j has remaining bandwidth (YES in step 1020), then the logic allocates a portion of the remaining bandwidth segments from queue i to queue j by increasing BW[j] by amount proportional to the relative weight of the queue j (i.e., by BW[i] times either X[j]/M if the total weight M is the sum of X[j] for all queues j, or BW[i] times Y[j]/M if the total weight M is the sum of Y[j] for all queues j), in step 1022, and proceeds to step 1024.

In step 1024, the logic determines whether all queues have been processed, specifically by determining whether the queue index j is equal to the number of queues N. If the queue index j is not equal to the number of queues N (NO in step 1024), then the logic recycles to step 1016 to process the next queue. If the queue index j is equal to the number of queues N (YES in step 1024), then the logic terminates in step 1099.

When the remaining bandwidth segments from the queue i are reallocated among the queues j, it is important that the bandwidth reallocation procedure 702 calculate the bandwidth reallocation for each queue j in such a way that the total number of bandwidth segments reallocated to the queues j not exceed the actual number of bandwidth segments BW[i]. Specifically, the bandwidth allocation procedure 702 must compensate for any rounding errors that would otherwise cause the total number of bandwidth segments reallocated to exceed the actual number of bandwidth segments BW[i]. Such compensation is not reflected in the figures, although many compensation techniques (for example, decrementing BW[i] by the number of bandwidth segments reallocated to each queue j and never reallocating more than BW[i] bandwidth segments) will become apparent to the skilled artisan.

Figure 11:
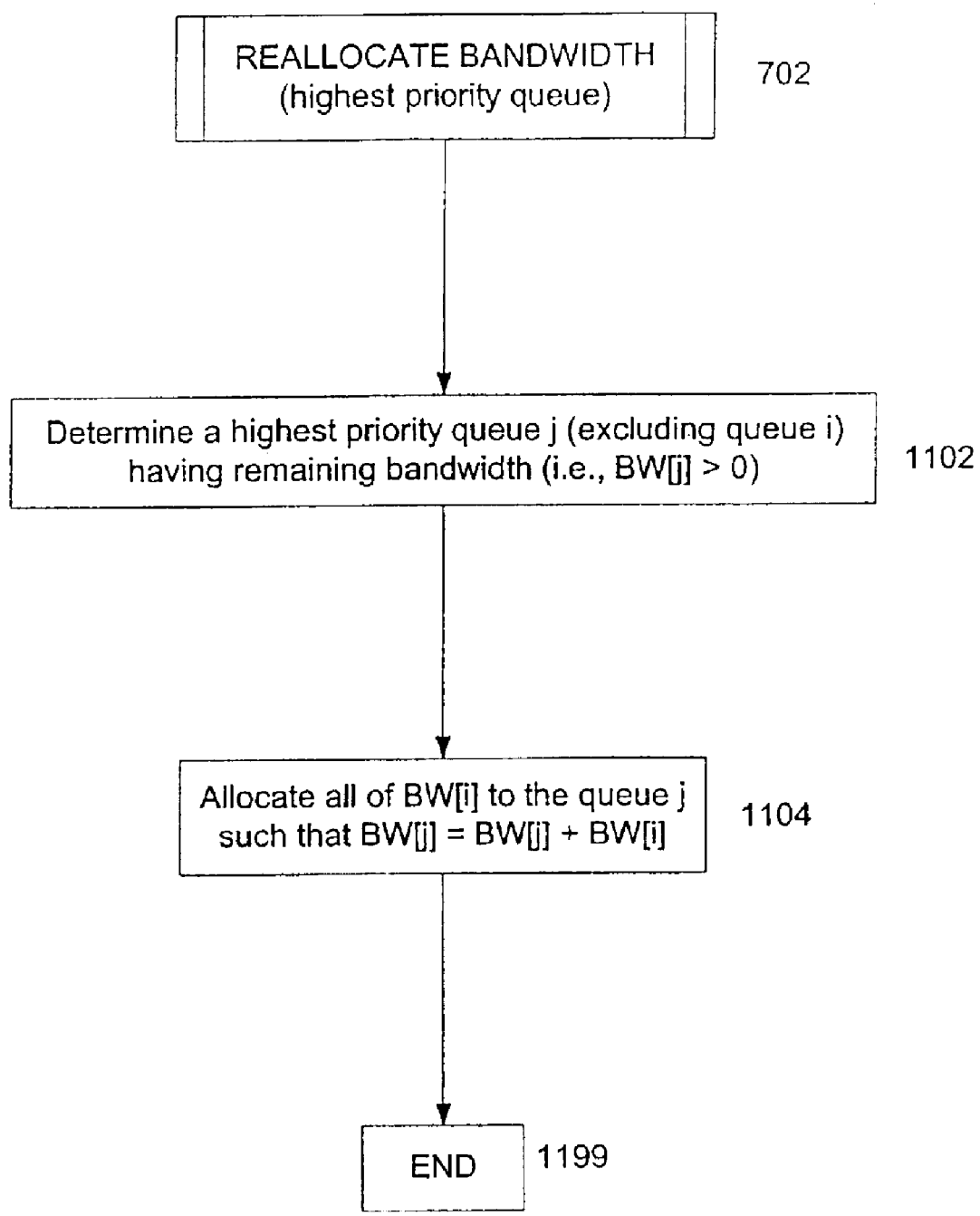
FIG. 11 is a logic flow diagram showing a third exemplary bandwidth reallocation procedure in accordance with the present invention in which the remaining bandwidth segments from the empty queue are distributed to a highest priority queue having remaining bandwidth.

Another embodiment of the bandwidth reallocation procedure 702, shown and described with reference to FIG. 11, distributes the remaining bandwidth segments from the queue i to the highest priority queue j having remaining bandwidth segments. Specifically, the logic determines a highest priority queue j (excluding the queue i) having remaining bandwidth, in step 1102, and proceeds to allocate all of the remaining bandwidth segments from the queue i to the queue j, in step 1104, such that BW[j] is increased by BW[i]. The logic terminates in step 1199.

Figure 12:
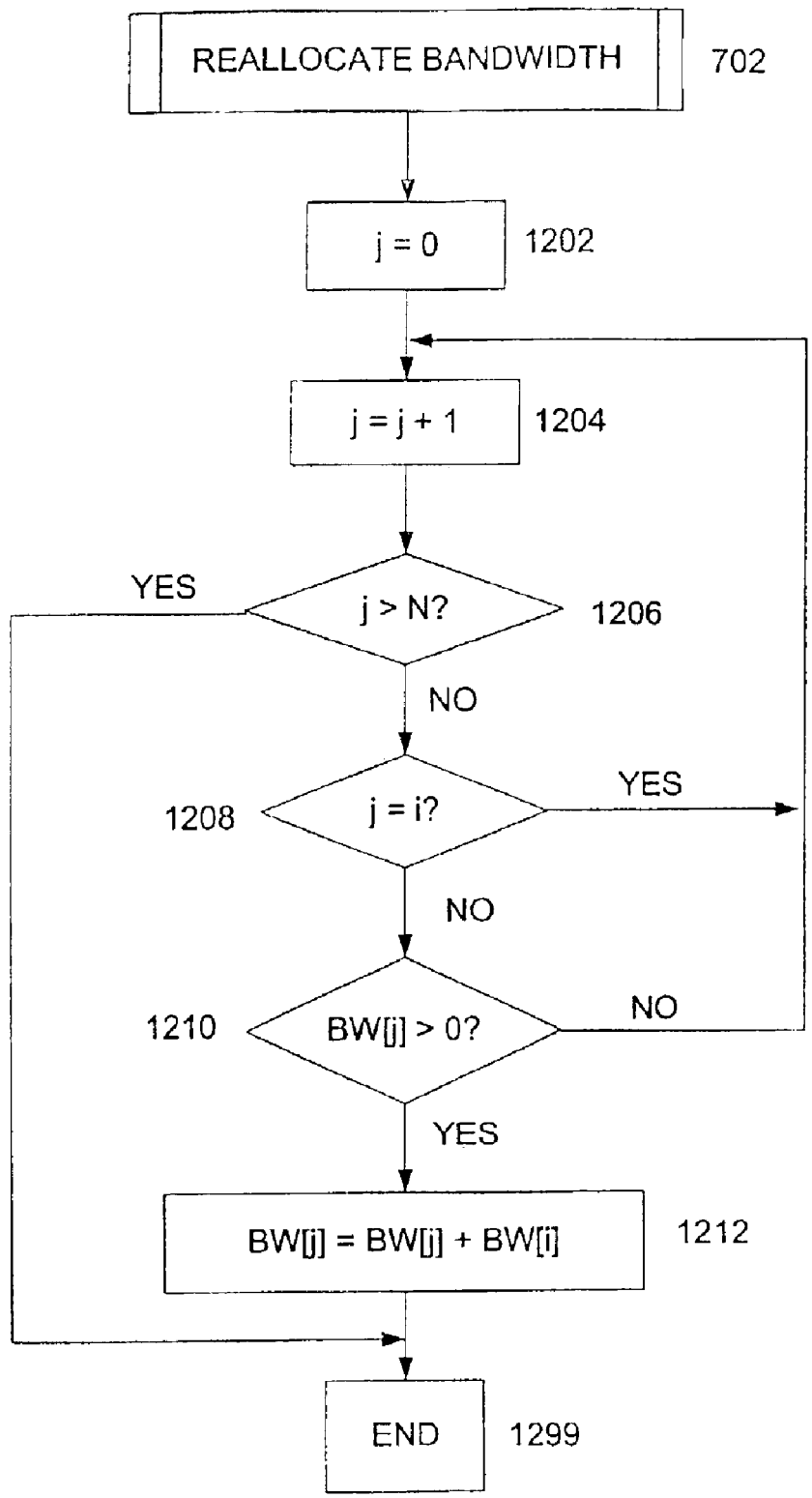
FIG. 12 is a logic flow diagram showing specific details of the third exemplary bandwidth reallocation procedure in accordance with the present invention in which the remaining bandwidth segments from the empty queue are distributed to a highest priority queue having remaining bandwidth.

Thus, with reference to FIG. 12, the logic first initializes the queue index j to zero (0), in step 1202. The logic then proceeds to determine the highest priority queue j having remaining bandwidth segments and allocate all of the remaining bandwidth segments from the queue i to the queue j (encompassing steps 1102 and 1104 from FIG. 11). Specifically, the logic increments the queue index j, in step 1204. The logic then determines whether all queues have been processed, specifically by determining whether the queue index j is greater than the number of queues N, in step 1206. If the queue index j is greater than the number of queues N (YES in step 1206), then the logic terminates in step 1299. However, assuming the queue index j is less than or equal to the number of queues N (NO in step 1206), then the logic determines whether the queue index j is equal to the queue index i, in step 1208. If the queue index j is equal to the queue index i (YES in step 1208), then the logic recycles to step 1204 to process the next queue. However, assuming the queue index j is not equal to the queue index i (NO in step 1208), then the logic determines whether the queue j has any remaining bandwidth, in step 1210. If the queue j has no remaining bandwidth (NO in step 1210), then the logic recycles to step 1204 to process the next queue. However, assuming the queue j has remaining bandwidth (YES in step 1210), then the logic allocates all of the remaining bandwidth segments from the queue i to the queue j by increasing BW[j] by BW[i], in step 1212, and terminates in step 1299.

Of course, many other embodiments of the bandwidth reallocation procedure 702 are possible to reflect different policy decisions. For example, one policy decision may be to reallocated the remaining bandwidth segments from the queue i to all queues having a higher priority than the queue i (as opposed to reallocating the remaining bandwidth segments from queue i to all queues having remaining bandwidth, as shown in FIGS. 9 and 10, or to only the highest priority queue having remaining bandwidth, as shown in FIGS. 11 and 12). This and other alternative embodiments will be apparent to the skilled artisan.

Figure 13:
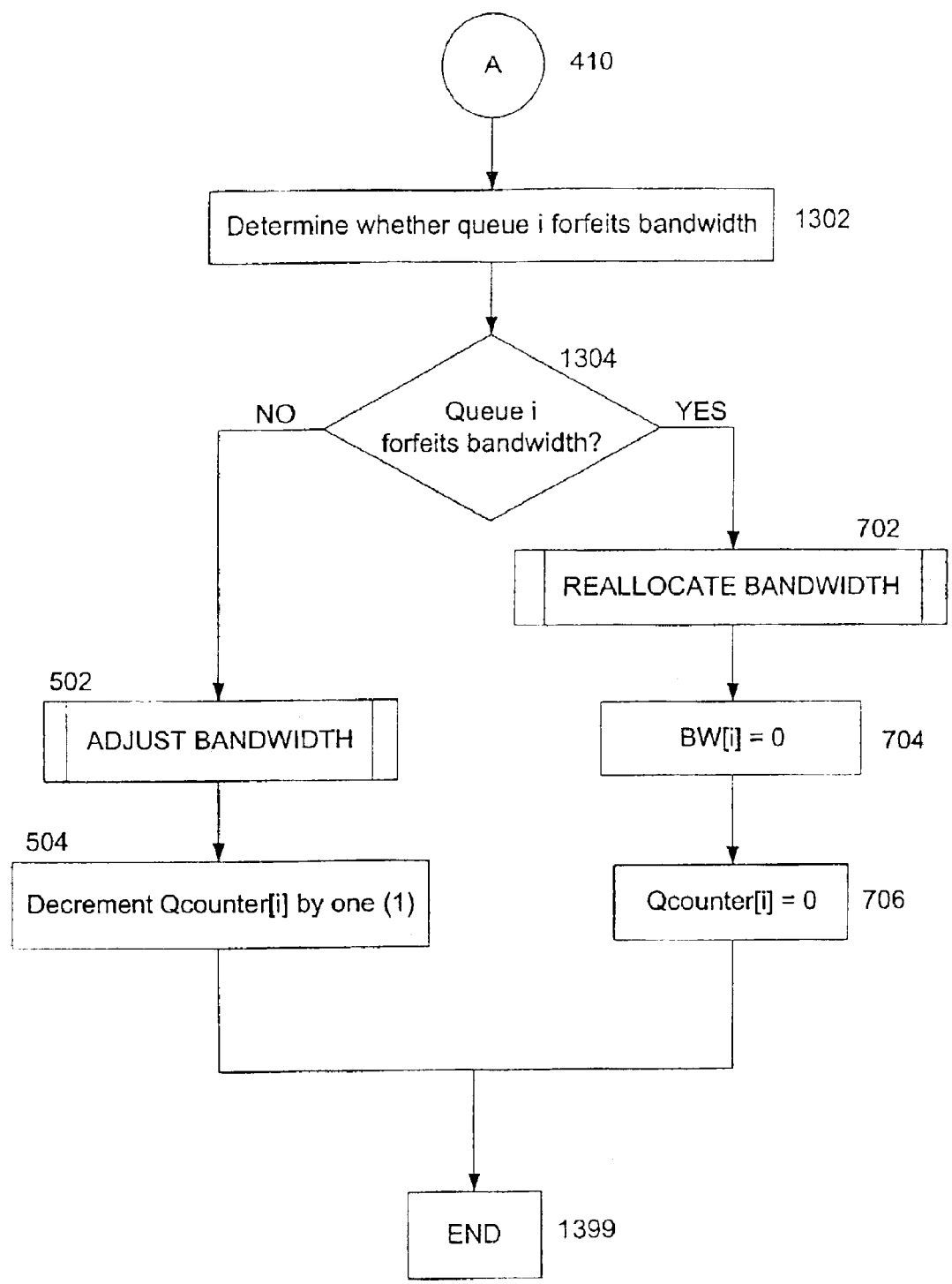
FIG. 13 is a logic flow diagram showing a third exemplary empty queue procedure in accordance with the present invention in which an empty queue selectively keeps its remaining bandwidth segments or forfeits its remaining bandwidth segments.

FIG. 13 is a logic flow diagram showing an exemplary empty queue procedure 410 in which the logic selectively reallocates the remaining bandwidth segments or permits the queue i to keep the remaining bandwidth segments. Specifically, the logic first determines whether the queue i must forfeit any remaining bandwidth segments, in step 1302, according to a predetermined scheme (described in detail below). If the queue i is permitted to keep any remaining bandwidth segments (NO in step 1304), then the logic performs the bandwidth adjustment procedure 502 (for example, as shown in FIGS. 6A, 6B, and 6C) to adjust the number of remaining bandwidth segments for queue i, and decrements the number of remaining transmission opportunities for the queue i by decrementing Qcounter[i] by one (1), in step 504. However, if the queue i is forced to forfeit any remaining bandwidth segments (YES in step 1304), then the logic performs the bandwidth reallocation procedure 702 (for example, as shown in FIGS. 9–12) to reallocate the bandwidth from the queue i to one or more other queues, forces the queue i to forfeit any remaining bandwidth segments by setting BW[i] equal to zero (0), in step 704, and forces the queue i to forfeit any remaining transmission opportunities by setting Qcounter[i] equal to zero (0), in step 706. The logic terminates in step 1399.

The determination made in step 1302 may be based upon a number of factors including, but not limited to, the priority of the queue i and the priorities of any other queues having remaining bandwidth. In one embodiment, for example, the highest priority queue (or any queue above a predetermined priority level) is permitted to keep any remaining bandwidth segments, while a queue at a lower priority is forced to forfeit any remaining bandwidth segments, in which case the forfeited bandwidth segments are reallocated. In another embodiment, for example, a queue i forfeits any remaining bandwidth segments only if there is at least one higher priority queue having remaining bandwidth, in which case the forfeited bandwidth segments are reallocated to the higher priority queue or queues. Of course, many alternative embodiment are possible and will become apparent to a skilled artisan.

The logic described with reference to FIGS. 3 and 4 was used to show the relationship between the bandwidth cycles and the round robin cycles. However, a preferred embodiment of the present invention, shown in FIG. 14, combines the bandwidth cycle logic loop of FIG. 3 with the round robin cycle loop of FIG. 4 in order to gain certain efficiencies. Specifically, in an embodiment adhering to FIGS. 3 and 4, the round robin logic loop of FIG. 4 may be repeated numerous times even after all queues have exhausted their respective bandwidth segments, since the round robin cycle must complete before the logic tests for the end of a bandwidth cycle. Therefore, it is preferable to test for the end of a bandwidth cycle as part of the round robin cycle logic loop, and start the next bandwidth cycle upon determining that the bandwidth cycle is completed.

Figure 14:
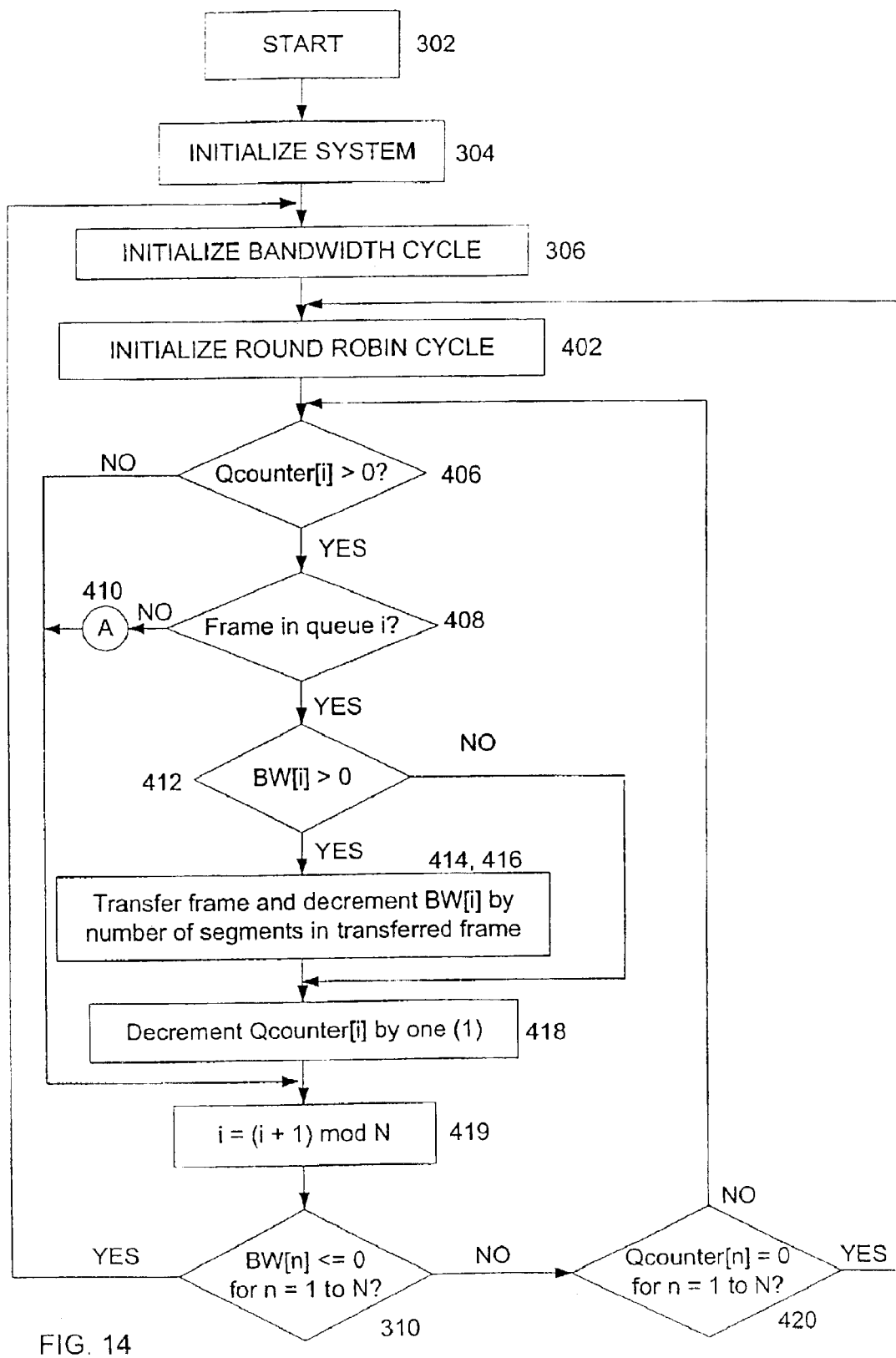
FIG. 14 is a logic flow diagram showing a preferred embodiment of the present invention in which the bandwidth cycle loop and the round robin cycle loop is combined.

Thus, as shown in FIG. 14, the logic begins in step 302, and proceeds to initialize the system, in step 304. Specifically, the logic initializes the values X[n] and Y[n] for all queues n as described above. The logic then initializes the bandwidth cycle, in step 306, by setting BW[n] equal to Y[n] for all queues n. The logic then initializes the round robin cycle, in step 402, by setting Qcounter[n] equal to X[n] for all queues n and by setting a queue index i equal to the index of the highest priority queue (i.e., queue 1 by convention). The logic then performs a logic loop in which transmission opportunities are provided for each queue i based upon, among other things, the number of transmission opportunities remaining for the queue i (i.e., Qcounter[i]) and the number of bandwidth segments remaining for the queue i (i.e., BW[i]). Specifically, the queue i is permitted to transfer a frame if at least one transmission opportunity remains (i.e., if Qcounter[i]>0), there is a frame in the queue i ready to be transferred, and at least one bandwidth segment remains (i.e., if BW[i]>0).

More specifically, the logic determines whether the queue i has at least one transmission opportunity remaining, in step 406. If the queue i has no transmission opportunities remaining (NO in step 406), then the logic proceeds to step 419. However, assuming the queue i has at least one transmission opportunity remaining (YES in step 406), then the logic determines whether there is a frame in the queue i ready to be transferred, in step 408. If there is no frame in the queue i ready to be transferred (NO in step 408), then the logic performs an empty queue procedure 410 (for example, as shown in FIGS. 5, 7, and 13), and proceeds to step 419. However, assuming there is a frame in the queue i ready to be transferred (YES in step 408), then the logic determines whether the queue i has at least one bandwidth segment remaining, in step 412. If the queue i has no bandwidth segments remaining (NO in step 412), then the logic proceeds to step 418. However, assuming the queue i has at least one bandwidth segment remaining (YES in step 412), then the logic transfers the frame from the queue i, in step 414, decrements BW[i] by the number of segments in the transferred frame, in step 416, and proceeds to step 418.

In step 418, the logic decrements Qcounter[i] by one (1). The logic then proceeds to step 419.

In step 419, the logic increments the queue index i to index the next queue. The logic then determines whether the bandwidth cycle is complete, in step 310, specifically by determining whether none of the queues n has any bandwidth segments remaining (i.e., whether BW[n]<=0 for n=1 to N). If at least one of the queues n has any bandwidth segments remaining (NO in step 310), then the logic proceeds to step 420. If none of the queues n has any bandwidth segments remaining (YES in step 310), then the logic recycles to step 306 to perform another bandwidth cycle.

In step 420, the logic determines whether the round robin cycle is complete, specifically by determining whether there are no transmission opportunities remaining for any of the queues (i.e., whether Qcounter[n]=0 for n=1 to N). If at least one of the queues has a transmission opportunity remaining (NO in step 420), then the logic recycles to step 406 to continue the current round robin cycle. If there are no transmission opportunities remaining for any of the queues (YES in step 420), then the logic recycles to step 402 to begin a new round robin cycle.

Certain workings of the present invention can be demonstrated by an example using four (4) queues (i.e., N=4) in decreasing priority, with queue 1 as the highest priority queue, and queue 4 as the lowest priority queue. The maximum frame length is presumed to be 1518 bytes (i.e., L=1518). The bandwidth segment size is presumed to be 64 bytes (i.e., S=64). It is convenient to equate one maximum length frame with some quanta of bandwidth, for example, ten (10) percent of the bandwidth in a bandwidth cycle. Thus, each maximum length frame would use ten (10) percent of the bandwidth in a bandwidth cycle, and therefore ten (10) maximum length frames can be transmitted in such a bandwidth cycle. Assuming that queue 1 gets forty (40) percent of the bandwidth, queue 2 gets thirty (30) percent of the bandwidth, queue 3 gets twenty (20) percent of the bandwidth, and queue 4 gets ten (10) percent of the bandwidth, then, using a quanta of ten (10) percent, queue 1 could transmit four (4) maximum length frames in one bandwidth cycle, queue 2 could transmit three (3) maximum length frames in one bandwidth cycle, queue 3 could transmit two (2) maximum length frames in one bandwidth cycle, and queue 4 could transmit one (1) maximum length frame in one bandwidth cycle.

With reference to the logic shown in FIG. 14, the logic begins in step 302, and proceeds to initialize the system, in step 304. Specifically, the logic initializes the values X[n] for all queues n such that X[1]=4, X[2]=3, X[3]=2, and X[4]=1 (i.e., the number of maximum length frames per round robin cycle), and also initializes the values Y[n] for all queues n such that Y[1]=95, Y[2]=72, Y[3]=48, and Y[4]=24 (i.e., the number of bandwidth segments needed to transmit X[n] frames).

The logic proceeds to initialize the bandwidth cycle, in step 306, by setting BW[n] equal to Y[n] for all queues n such that BW[1]=95, BW[2]=72, BW[3]=48, and BW[4]=24. The logic then initializes the round robin cycle, in step 402, by setting Qcounter[n] equal to X[n] for all queues n such that Qcounter[1]=4, Qcounter[2]=3, Qcounter[3]=2, and Qcounter[4]=1, and by setting the queue index i equal to the index of the queue 1 (i.e., the highest priority queue). The logic then performs a logic loop in which transmission opportunities are provided for each queue i based upon, among other things, the number of transmission opportunities remaining for the queue i (i.e., Qcounter[i]) and the number of bandwidth segments remaining for the queue i (i.e., BW[i]). Specifically, the queue i is permitted to transfer a frame if at least one transmission opportunity remains (i.e., if Qcounter[i]>0), there is a frame in the queue i ready to be transferred, and at least one bandwidth segment remains (i.e., if BW[i]>0).

In a first iteration of the loop, the logic determines whether queue 1 has at least one transmission opportunity remaining, in step 406. Since Qcounter[1] is equal to four (4), the logic proceeds to determine whether there is a frame in queue 1 ready to be transferred, in step 408.

Assuming there is a frame in queue 1 ready to be transferred (YES in step 408), then the logic determines whether queue 1 has at least one bandwidth segment remaining, in step 412. Since BW[1] is equal to 95 (YES in step 412), the logic transfers the frame from queue 1, in step 414, decrements BW[1] by the number of segments in the transferred frame, in step 416, decrements Qcounter[1] by one (1), in step 418, and continues on from step 419 to process queue 2.

However, assuming there is no frame in queue 1 ready to be transferred (NO in step 408), the logic performs an empty queue procedure 410, for example, the empty queue procedure 702 as shown in FIG. 7. In the empty queue procedure 702 shown in FIG. 7, the logic performs a bandwidth reallocation procedure 702, for example, the bandwidth reallocation procedure 702 as shown in FIG. 9. In the bandwidth reallocation procedure 702 shown in FIG. 9, the logic first determines the total weight M of all queues j (excluding queue 1) having remaining bandwidth, in step 902. Since queues 2, 3, and 4 all have remaining bandwidth, then, using X[j] to compute the total weight M, the total weight M is equal to the sum of X[2], X[3], and X[4] which equals six (6). The logic then allocates a relative portion of the 95 bandwidth segments from queue 1 to queues 2, 3, and 4, in step 904. Specifically, queue 2 receives roughly three-sixths (i.e., X[2]/M), or one-half, of the 95 bandwidth segments; queue 3 receives roughly two-sixths (i.e., X[3]/M), or one-third, of the 95 bandwidth segments; and queue 4 receives roughly one-sixth (i.e., X[4]/M) of the 95 bandwidth segments. Since the total number of bandwidth segments allocated to queues 2, 3, and 4 should not exceed 95, the actual number of bandwidth segments allocated to each of the queues must be rounded accordingly. For example, the 95 bandwidth segments may be allocated such that queue 2 receives 48 bandwidth segments, queue 3 receives 32 bandwidth segments, and queue 4 receives 15 bandwidth segments. Of course, other allocations are possible using other rounding schemes. After completing the bandwidth reallocation procedure 702, the logic completes the empty queue procedure 410, which includes setting BW[1] equal to zero (0) in step 704 and setting Qcounter[1] equal to zero (0) in step 706, and continues on from step 419 to process queue 2.

Without following the logic through each iteration of the loop, it will be apparent that the round robin loop provides ten (10) transmission opportunities, and specifically four (4) transmission opportunities for queue 1, three (3) transmission opportunities for queue 2, two (2) transmission opportunities for queue 3, and one (1) transmission opportunity for queue 1, provided in round-robin fashion such that the queues are provided transmission opportunities in the following order: 1, 2, 3, 4, 1, 2, 3, 1, 2, 1 (assuming none of the queues forfeit bandwidth). If all transmitted frames are maximum length frames, then the bandwidth cycle will terminate at the end of a single round robin loop, at which time the logic begins another bandwidth cycle. However, assuming some of the transmitted frames are smaller than maximum length frames, then at least one of the queues will have remaining bandwidth at the end of the first round robin cycle, in which case the logic begins another round robin cycle within the same bandwidth cycle. Again, transmission opportunities are provided to the queues in round-robin fashion, and specifically in the order previously described, although only those queues having remaining bandwidth are permitted to transmit frames during the subsequent round robin cycle. At the end of each round robin cycle, the logic begins another round robin cycle if any of the queues has remaining bandwidth.

In a preferred embodiment of the present invention, predominantly all of the Adaptive WRR Scheduler 202 logic is implemented as a set of computer program instructions that are stored in a computer readable medium and executed by an embedded microprocessor system within the scheduling device 200. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention includes an adaptive weighted round robin scheduling method for scheduling variable-length frame transmissions from a plurality of output queues having different transmission priorities. The adaptive weighted round robin scheduling method allocates, for each queue, a predetermined number of bandwidth segments for a bandwidth cycle of the adaptive weighted round robin scheduling method as well as a predetermined number of transmission opportunities for a round robin cycle of the adaptive weighted round robin scheduling method. The adaptive weighted round robin scheduling method then processes the queues consecutively in a round-robin fashion, beginning with a highest priority queue. Specifically, for each queue, the adaptive weighted round robin scheduling method first determines whether the queue has at least one remaining transmission opportunity for the round robin cycle. Upon determining that the queue has at least one remaining transmission opportunity for the round robin cycle, the adaptive weighted round robin scheduling method determines whether the queue has a frame ready for transmission. Upon determining that the queue has no frame ready for transmission, the adaptive weighted round robin scheduling method performs a predetermined empty queue procedure. Upon determining that the queue has a frame ready for transmission, the adaptive weighted round robin scheduling method decrements the number of remaining transmission opportunities for the round robin cycle and proceeds to determine whether the queue has at least one remaining bandwidth segment for the bandwidth cycle. Upon determining that the queue has at least one remaining bandwidth segment for the bandwidth cycle, the adaptive weighted round robin scheduling method transfers the frame from the queue and decreases the number of remaining bandwidth segments for the bandwidth cycle by a number of bandwidth segments consumed by the frame.

The adaptive weighted round robin scheduling method determines that a bandwidth cycle is complete by determining that none of the queues has any remaining bandwidth segments for the bandwidth cycle, upon which the adaptive weighted round robin scheduling method begins another bandwidth cycle by repeating the steps of allocating, for each queue, the predetermined number of bandwidth segments for a bandwidth cycle and the predetermined number of transmission opportunities for a round robin cycle, and processing the queues consecutively in a round-robin fashion, beginning with the highest priority queue.

The adaptive weighted round robin scheduling method determines that a round robin cycle is complete by determining that at least one of the queues has at least one remaining bandwidth segment for the bandwidth cycle of the adaptive weighted round robin scheduling method and that none of the queue has any remaining transmission opportunities for the round robin cycle of the adaptive weighted round robin scheduling method, upon which the adaptive weighted round robin scheduling method begins another round robin cycle by repeating the steps of allocating, for each queue, the predetermined number of transmission opportunities for a round robin cycle and processing the queues consecutively in a round-robin fashion, beginning with the highest priority queue.

In one embodiment of an empty queue procedure, the adaptive weighted round robin scheduling method adjusts the number of remaining bandwidth segments according to a predetermined bandwidth adjustment procedure and decrements the number of remaining transmission opportunities for the round robin cycle of the adaptive weighted round robin scheduling method.

In another embodiment of an empty queue procedure, the adaptive weighted round robin scheduling method reallocates the number of remaining bandwidth segments to at least one of the other queues according to a predetermined bandwidth reallocation procedure, sets the number of remaining bandwidth segments for the bandwidth cycle of the adaptive weighted round robin scheduling method to zero (0), and sets the number of remaining transmission opportunities for the round robin cycle of the adaptive weighted round robin scheduling method to zero (0).

The present invention also includes an adaptive weighted round robin scheduler for scheduling variable-length frame transmissions from a plurality of output queues having different transmission priorities. The adaptive weighted round robin scheduler includes bandwidth segment allocation logic operably coupled to allocate, for each queue, a predetermined number of bandwidth segments for an adaptive weighted round robin scheduling logic bandwidth cycle, transmission opportunity allocation logic operably coupled to allocate, for each queue, a predetermined number of transmission opportunities for an adaptive weighted round robin scheduling logic round robin cycle, and adaptive weighted round robin scheduling logic operably coupled to process the queues consecutively in a round-robin fashion, beginning with a highest priority queue. The adaptive weighted round robin scheduling logic encompasses logic for performing the steps of the adaptive weighted round robin scheduling method.

The present invention further includes a program product comprising a computer readable medium having embodied therein a computer readable program for scheduling variable-length frame transmissions from a plurality of output queues having different transmission priorities. The computer readable program includes bandwidth segment allocation logic programmed to allocate, for each queue, a predetermined number of bandwidth segments for an adaptive weighted round robin scheduling logic bandwidth cycle, transmission opportunity allocation logic programmed to allocate, for each queue, a predetermined number of transmission opportunities for an adaptive weighted round robin scheduling logic round robin cycle, and adaptive weighted round robin scheduling logic programmed to process the queues consecutively in a round-robin fashion, beginning with a highest priority queue. The adaptive weighted round robin scheduling logic encompasses logic for performing the steps of the adaptive weighted round robin scheduling method.

The present invention additionally includes a scheduling device including a plurality of output queues for queuing variable-length frames having different transmission priorities, each queue corresponding to a different one of the transmission priorities, an adaptive weighted round robin scheduler responsive to the plurality of queues and operably coupled to schedule variable-length frame transmissions, and an output port operably coupled to receive the variable-length frame transmissions from the adaptive weighted round robin scheduler. The adaptive weighted round robin scheduler encompasses logic for performing the steps of the adaptive weighted round robin scheduling method.

The present invention may be embodied in other specific forms without departing from the essence or essential characteristics. The described embodiments are to be considered in all respects only as illustrative and not restrictive.

We claim:

1. A method for scheduling data transmissions, comprising:
   identifying a number of bandwidth segments associated with each of a plurality of queues, each queue associated with a different priority and operable to store one or more frames of data;
   identifying a number of transmission opportunities associated with each of the queues; and
   scheduling transmission of the frames in the queues by examining each queue in order of decreasing priority and determining whether the queue being examined contains a frame ready for transmission, has at least one transmission opportunity remaining, and has at least one bandwidth segment remaining.

2. The method of claim 1, wherein each queue is operable to store frames of data associated with a bandwidth requirement, and further comprising assigning a weight to each of the plurality of queues based at least partially on the bandwidth requirement for the queue; and
   wherein the number of bandwidth segments and the number of transmission opportunities for each queue is based at least partially on the weight associated with the queue.

3. The method of claim 1, wherein examining the queues comprises:

determining whether one of the queues has at least one transmission opportunity remaining;

determining whether the queue contains a frame ready for transmission when the queue has at least one transmission opportunity remaining; and determining whether the queue has at least one bandwidth segment remaining when the queue contains a frame ready for transmission.

4. The method of claim 1, further comprising penalizing one of the queues when no frame in the queue is ready for transmission when the queue is examined.

5. The method of claim 4, wherein penalizing the queue comprises reducing the number of bandwidth segments associated with the queue.

6. The method of claim 5, wherein reducing the number of bandwidth segments comprises one of:

reducing the number of bandwidth segments to a value of zero;

reducing the number of bandwidth segments by a specified amount;

reducing the number of bandwidth segments based on a size of a frame previously transmitted from the penalized queue;

reducing the number of bandwidth segments based on an average size of frames previously transmitted from the penalized queue;

reducing the number of bandwidth segments based on an average size of frames previously transmitted from all queues; and reducing the number of bandwidth segments based on a maximum size of a frame.

7. The method of claim 5, further comprising reallocating the bandwidth segments from the penalized queue to at least one other queue.

8. The method of claim 7, wherein reallocating the bandwidth segments comprises reallocating the bandwidth segments to one or more queues based on weights associated with the one or more queues.

9. The method of claim 7, wherein reallocating the bandwidth segments comprises reallocating the bandwidth segments to the queue with the highest priority and at least one remaining bandwidth segment.

10. The method of claim 1, further comprising decrementing the number of transmission opportunities associated with one of the queues when the queue is examined.

11. The method of claim 10, further comprising decreasing the number of bandwidth segments associated with one of the queues by based on a size of a frame in the queue that is scheduled for transmission.

12. The method of claim 1, further comprising:

determining whether the number of bandwidth segments associated with each queue has a value of zero; and repeating both identification steps and the scheduling step when the number of bandwidth segments associated with each queue that has a value of zero.

13. The method of claim 12, further comprising:

determining whether the number of transmission opportunities associated with each queue has a value of zero;

repeating the scheduling step when the number of transmission opportunities associated with at least one of the queues has a non-zero value; and repeating the transmission opportunity identification step and the scheduling step when the number of transmission opportunities associated with each queue has a value of zero.

14. The method of claim 1, wherein scheduling transmission of the frames further comprises communicating the frames to an output port operable to transmit the frames.

15. A system for scheduling data transmissions, comprising:

a plurality of queues each associated with a different priority and operable to store one or more frames of data; and a scheduler operable to:

identify a number of bandwidth segments associated with each of the queues;

identify a number of transmission opportunities associated with each of the queues; and schedule transmission of the frames in the queues by examining each queue in order of decreasing priority and determining whether the queue being examined contains a frame ready for transmission, has at least one transmission opportunity remaining, and has at least one bandwidth segment remaining.

16. The system of claim 15, wherein:

each queue is operable to store frames of data associated with a bandwidth requirement;

the scheduler is further operable to assign a weight to each of the plurality of queues based at least partially on the bandwidth requirement for the queue; and the scheduler is operable to identify the number of bandwidth segments and the number of transmission opportunities for each queue using the weight associated with the queue.

17. The system of claim 15, wherein the scheduler is operable to examine one of the queues by:

determining whether the queue has at least one transmission opportunity remaining;

determining whether the queue contains a frame ready for transmission when the queue has at least one transmission opportunity remaining; and determining whether the queue has at least one bandwidth segment remaining when the queue contains a frame ready for transmission.

18. The system of claim 15, wherein the scheduler is further operable to penalize one of the queues when no frame in the queue is ready for transmission when the queue is examined.

19. The system of claim 18, wherein the scheduler is operable to penalize the queue by reducing the number of bandwidth segments associated with the queue.

20. The system of claim 18, wherein the scheduler is further operable to reallocate the bandwidth segments from the penalized queue to at least one other queue.

21. The system of claim 15, wherein the scheduler is further operable to:

decrement the number of transmission opportunities associated with one of the queues when the queue is examined; and decrease the number of bandwidth segments associated with one of the queues by based on a size of a frame in the queue that is scheduled for transmission.

22. The system of claim 15, wherein the scheduler is further operable to:

determine whether the number of bandwidth segments associated with each queue has a value of zero;

repeat the identification operations and the scheduling operation when the number of bandwidth segments associated with each queue has a value of zero;

determining whether the number of transmission opportunities associated with each queue has a value of zero when the number of bandwidth segments associated with at least one of the queues has a non-zero value;

repeating the scheduling operation when the number of transmission opportunities associated with at least one of the queues has a non-zero value; and repeating the transmission opportunity identification operation and the scheduling operation when the number of transmission opportunities associated with each queue has a value of zero.

23. The system of claim 15, further comprising an output port operable to transmit the frames from the queues.

24. Logic embodied on a computer readable medium and operable when executed to:

identify a number of bandwidth segments associated with each of a plurality of queues, each queue associated with a different priority and operable to store one or more frames of data;

identify a number of transmission opportunities associated with each of the queues; and schedule transmission of the frames in the queues by examining each queue in order of decreasing priority and determining whether the queue being examined contains a frame ready for transmission, has at least one transmission opportunity remaining, and has at least one bandwidth segment remaining.

25. The logic of claim 24, wherein:

each queue is operable to store frames of data associated with a bandwidth requirement;

the logic is further operable to assigning a weight to each of the plurality of queues based at least partially on the bandwidth requirement for the queue; and the number of bandwidth segments and the number of transmission opportunities for each queue is based at least partially on the weight associated with the queue.

26. The logic of claim 24, wherein the logic is operable to examine one of the queues by:

determining whether the queue has at least one transmission opportunity remaining;

determining whether the queue contains a frame ready for transmission when the queue has at least one transmission opportunity remaining; and determining whether the queue has at least one bandwidth segment remaining when the queue contains a frame ready for transmission.

27. The logic of claim 24, wherein the logic is further operable to penalize one of the queues when no frame in the queue is ready for transmission when the queue is examined.

28. The logic of claim 27, wherein the logic is operable to penalize the queue by reducing the number of bandwidth segments associated with the queue.

29. The logic of claim 28, wherein the logic is further operable to reallocate the bandwidth segments from the penalized queue to at least one other queue.

30. The logic of claim 29, wherein the logic is operable to reallocate the bandwidth segments by reallocating the bandwidth segments to one or more queues based on weights associated with the one or more queues.

31. The logic of claim 29, wherein the logic is operable to reallocate the bandwidth segments by reallocating the bandwidth segments to the queue with the highest priority and at least one remaining bandwidth segment.

32. The logic of claim 24, wherein the logic is further operable to:

decrement the number of transmission opportunities associated with one of the queues when the queue is examined; and decrease the number of bandwidth segments associated with one of the queues by based on a size of a frame in the queue that is scheduled for transmission.

33. The logic of claim 24, wherein the logic is further operable to:

determine whether the number of bandwidth segments associated with each queue has a value of zero;

repeat both identification steps and the scheduling step when the number of bandwidth segments associated with each queue has a value of zero;

determine whether the number of transmission opportunities associated with each queue has a value of zero when the number of bandwidth segments associated with at least one of the queues has a non-zero value;

repeating the scheduling step when the number of transmission opportunities associated with at least one of the queues has a non-zero value; and repeating the transmission opportunity identification step and the scheduling step when the number of transmission opportunities associated with each queue has a value of zero.

34. The logic of claim 24, wherein the logic is operable to schedule transmission of the frames by communicating the frames to an output port operable to transmit the frames.

* * * * *